(12) United States Patent
Horwath

(10) Patent No.: US 8,881,480 B1
(45) Date of Patent: Nov. 11, 2014

(54) CONSTRUCTION ASSEMBLY AND METHOD

(75) Inventor: Peter F. Horwath, Randleman, NC (US)

(73) Assignee: Phase Change Energy Solutions, Inc., Asheboro, NC (US)

( * ) Notice: Subject to any disclaimer, the term of this patent is extended or adjusted under 35 U.S.C. 154(b) by 175 days.

(21) Appl. No.: 13/480,577

(22) Filed: May 25, 2012

(51) Int. Cl.
*E04B 1/74* (2006.01)

(52) U.S. Cl.
USPC ..... 52/407.5; 52/407.4; 52/406.3; 52/309.13; 52/309.17; 428/69

(58) Field of Classification Search
USPC ............. 52/796.1, 794.1, 404, 406.3, 407.5, 52/309.11, 407.4, 426, 404.1, 309.17, 52/309.13; 126/618; 428/68, 69, 72; 425/143, 144
See application file for complete search history.

(56) References Cited

U.S. PATENT DOCUMENTS

| | | | |
|---|---|---|---|
| 4,596,237 A | 6/1986 | Melchior et al. | 126/430 |
| 4,708,812 A * | 11/1987 | Hatfield | 252/70 |
| 4,829,733 A * | 5/1989 | Long | 52/309.11 |
| 5,626,936 A | 5/1997 | Alderman | 428/68 |
| 5,770,295 A | 6/1998 | Alderman | 428/68 |
| 5,987,834 A * | 11/1999 | Keith et al. | 52/410 |
| 5,996,297 A * | 12/1999 | Keith et al. | 52/410 |
| 6,112,491 A * | 9/2000 | Keith et al. | 52/410 |
| 6,138,981 A * | 10/2000 | Keith et al. | 249/41 |
| 6,263,638 B1 | 7/2001 | Long, Sr. | 52/794.1 |
| 6,272,805 B1 * | 8/2001 | Ritter et al. | 52/309.11 |
| 6,615,906 B1 | 9/2003 | Fieback et al. | 165/10 |
| 6,645,598 B2 | 11/2003 | Alderman | 428/69 |
| 6,672,024 B2 | 1/2004 | Alderman | 52/407.3 |
| 6,694,693 B2 | 2/2004 | Alderman | 52/478 |
| 6,705,055 B2 * | 3/2004 | Ritter et al. | 52/309.11 |
| 6,769,223 B2 | 8/2004 | Alderman | 52/749.12 |
| 6,955,018 B2 | 10/2005 | Alderman | 52/407.4 |
| 7,266,931 B2 | 9/2007 | Long, Sr. | 52/426 |
| 7,641,812 B2 | 1/2010 | Alderman | 252/70 |
| 7,703,254 B2 | 4/2010 | Alderman | 52/506.07 |
| 7,704,584 B2 | 4/2010 | Alderman | 428/72 |
| 8,555,584 B2 * | 10/2013 | Ciuperca | 52/309.7 |
| 2003/0061776 A1 | 4/2003 | Alderman | 52/404.1 |
| 2005/0102968 A1 * | 5/2005 | Long et al. | 52/782.1 |
| 2006/0080923 A1 * | 4/2006 | Fleischhacker | 52/403.1 |
| 2011/0061329 A1 * | 3/2011 | Tadros et al. | 52/583.1 |

OTHER PUBLICATIONS

European Patent Application 08450003.2 filed Jan. 17, 2008 of Tibor G. Horwath and Published as EP 1 947 411 on Jul. 23, 2008.

* cited by examiner

*Primary Examiner* — Chi Q Nguyen
(74) *Attorney, Agent, or Firm* — Blake P. Hurt

(57) ABSTRACT

A construction assembly for installation within new or existing residential or commercial building structures which increases the thermal efficiency of concrete construction panels while avoiding dangerous insulation materials and potential fire hazards. The construction assembly includes a first layer of concrete and a phase change material layer that efficiently retains heat when the phase change material melts and discharges heat as the phase change material crystallizes. Alternatively a support layer, a second phase change material layer and a second concrete layer can be included in a variety of combinations for increased efficiency. A method is disclosed for creating the construction assembly.

11 Claims, 5 Drawing Sheets

CONSTRUCTION ASSEMBLY AND METHOD

FIELD OF THE INVENTION

The invention herein pertains to an insulation system employed in commercial, residential, and industrial buildings, and more particularly pertains to a laminated phase change structure designed to utilize the heat-retaining properties of phase change material positioned, for example, between a pair of concrete panels for a variety of uses including the construction of ceilings, floors, and walls used in energy-efficient building projects.

DESCRIPTION OF THE PRIOR ART AND OBJECTIVES OF THE INVENTION

Incorporating an insulating material between two layers of concrete with the purpose of increasing the energy efficiency of conventional building materials such as concrete is well-known. However, efforts to utilize this principle in a structural system with sufficient flexibility to encompass a wide range of construction applications have met with limited success. The insulated concrete systems currently marketed are generally inadequate due to insufficient heat-retaining properties, excessive bulk and weight characteristics, structural weakness, or a combination of these inadequacies.

In addition to the traditional shortcomings of available insulated structural systems, conventional insulating methods have become increasingly detrimental to the environment. For example, a common insulating material, polystyrene, is toxic to wildlife in addition to being a known carcinogen.

Certain insulated construction assemblies are formed of two independent concrete panels with a layer of insulating material between the panels to achieve both structural and insulation properties. In this arrangement the addition of a second layer of concrete, insulation material, reinforcing material such as steel, and the connectors necessary for adherence to the primary layer of concrete produce a heavy panel that is usually difficult to handle.

Historically concrete panels were poured into pre-molded forms to be cast, but builders quickly realized that without reinforcement, such panels were limited in size, flexibility, and strength. Thereafter, craftsmen began to include various inserts within the individual concrete panels as well as attaching two or more panels together to increase structural strength. In the beginning, panels were attached using fasteners such as bolts, screws, and anchors. However, as the desire for larger and more structurally stable concrete panels increased, so to did the development of improved fasteners. Presently, carbon fiber connectors are used which are lightweight and non-corrosive in addition to possessing low thermal conductivity. By way of example, the THERMOMASS® fiber composite connector is a standard commercial type of fastener.

The mechanical connection of two heavy independent concrete panels with an insulation layer disposed between presents structural problems which are difficult to overcome. Furthermore the insulation thickness which can be incorporated between the concrete layers without compounding the structural problems may be limited.

Traditional insulation materials in available systems seek to cover the entire face of the concrete panel to maximize the insulating effect. Failure to achieve maximum coverage leads to inefficient insulation and provides avenues for heat to escape. However, in seeking to fully cover a concrete panel, insulating material may be exposed at the edges of the finished product. This often allows moisture to penetrate between the layers of concrete, causing corrosion of unprotected fasteners, decay of insulating material, loss of insulative properties, and potential structural weakness following freeze/thaw seasonal cycles. Also, exposed insulation material may be a fire hazard that can cause non-compliance with applicable fire codes.

Phase change material is well-known in the prior art. Phase change material undergoes a physical phase change, such as from a crystal to a liquid at a functional temperature. For an example of conventional phase change material, the prior art teaches the use of calcium chloride hexahydrate, paraffin, or a series of salt hydrates, and it is the latent heat absorbed or expelled in accomplishing phase change which is capable of being stored by the phase change material. See U.S. Pat. No. 4,708,812 or 5,626,936.

As an example, these salts are particularly useful because the chemical characteristics of salts allow them to be used in construction projects such as buildings. Their melting temperature is within a range that is suitable for efficient heat transfer in construction applications and the energy capacity of the material is large enough so that a significant amount of energy can be stored in a structure of limited size and weight.

Recent advances in materials technology have rendered possible the production of materials that can store significantly more heat per unit mass than conventional materials, such as salt hydrates, in the temperature ranges of interest. In addition to the heat stored in any matter via thermal flow, latent heat is stored due to a phase transition of the material. Phase change materials are available for a wide range of phase change temperatures and are producible with a low weight and for a low cost.

Energy efficiency in buildings depends primarily on two parameters of the exterior walls. The first is the thermal resistance of a given material, also referred to as thermal conductivity or heat insulation. This parameter is typically characterized by a R-value and refers to heat flow through a material and the respective energy required to maintain a desired temperature.

The other parameter is the heat storage capacity of a given material. Sometimes referred to as thermal mass, heat storage capacity affects the extent that the interior temperature follows the exterior temperature, without heating or cooling.

Thus, in view of the problems and disadvantages associated with prior art devices, the present invention was conceived and one of its objectives is to provide an energy efficient, structurally sound construction assembly to be used in a variety of building applications.

It is another objective of the present invention to provide a construction assembly having a phase change material component that will increase the heat retention of a building without aesthetically unpleasing and unhealthy insulation products.

It is still another objective of the present invention to provide a method for forming a phase change material and concrete sandwich that will exhibit the structural strength of concrete.

It is yet another objective of the present invention to provide a phase change material construction assembly that is inexpensive to implement and easy to maintain in production or at a jobsite.

It is a further objective of the present invention to efficiently provide a retrofit construction assembly to provide heat energy storage for commercial and residential buildings, regardless of whether they are new or existing structures.

It is still a further objective of the present invention to provide heat storage for concrete construction assemblies, culverts, sidewalks, driveways, and pipes, which make use of phase change materials.

It is yet a further objective of the present invention to provide unskilled labor a manner in which to provide heat storage for various construction projects.

It is a still further objective of the present invention to provide a construction assembly that has an exterior panel of concrete that is greater in size than an interior panel of concrete.

Various other objectives and advantages of the present invention will become apparent to those skilled in the art as a more detailed description is set forth below.

SUMMARY OF THE INVENTION

The aforesaid and other objectives are realized by providing a construction assembly with a layer of standard phase change material and a panel of concrete for creating a component that will have a high R-value and a larger thermal mass than conventional building materials increasing efficiency of the cooling or heating systems. In the preferred embodiment of the invention, the construction assembly will include two concrete panels, two layers of phase change material disposed between the concrete panels, a support layer disposed between the layers of phase change material, and fasteners to attach the layers of phase change material to the support layer. Also disclosed is an alternate construction assembly that includes a wooden support layer. The resulting construction assembly is compatible with fasteners that can be hammered, screwed, or adhered into position, all of which may be used to attach and center the layers of phase change material on the concrete panel.

In the preferred method for forming the construction assembly disclosed herein, a first layer of concrete is formed in a mold while a phase change material layer is attached by a fastener to a support layer. The support layer and the phase change material layer are then centered in the mold using fasteners which affix to the concrete layers. The layers affixed by the fasteners are then covered in a subsequent pouring of concrete and allowed to dry (cure). The finished product is then removed from the mold and is ready for use. The fastener provides for structural strength once the concrete layer has hardened. This allows for simple integration of a phase change material layer with concrete without effecting the structural integrity of the building while simultaneously satisfying fire safety concerns.

The construction assemblies and method as described herein allow for increasing the thermal mass of a structure and the efficiency of the cooling or heating system. This construction assembly design allows for a simple method to integrate phase change materials into concrete construction without effecting the structural integrity of the building while also satisfying fire safety codes. Although not shown it should be understood that the construction assembly could allow for a continuous layer of phase change material to be introduced into a building or wall structure, including ceilings and floors. Further, the assemblies as shown herein can be utilized in residential, commercial and industrial buildings, by either new construction or retrofitted into existing structures and also in construction of various concrete assemblies such as culverts and pipes, which could withstand temperature changes. The assemblies can be integrated into the structure of bridges roadways and other structures to reduce temperature change and reduce degradation of the structure, reduce ice and/or snow buildup, and reduce heat island effect. Various uses are contemplated and as such should not be limited to the construction assembly examples shown herein.

No preferred dimensions are provided as the construction assemblies are versatile and dimensions would be determined based on the structural placement or use and particular climate zones encountered. Preferably the interior layer of concrete when the construction assemblies are used for a building wall is thicker than the exterior layer and the effect of having the phase change material layer within the assembly will impact more of the thermal mass of the structure. The phase change material layer effects the structure by reducing the temperature extremes to which the interior layer of concrete is exposed. Since concrete temperatures tend to stabilize to the average temperature to which it is exposed during a daily cycle, reducing this temperature variation brings it into line with the desired building interior temperature HVAC energy savings will then be obtained, optimally in excess of 30% over traditional concrete building structures.

DETAILED DESCRIPTION OF THE PREFERRED EMBODIMENT AND OPERATION OF THE INVENTION

For a better understanding of the invention and its operation, turning now to the drawings, FIGS. 1-10 schematically demonstrate construction assemblies 10, 16, 20, and 26 which are provided for assembling thermally efficient walls, floors, or the like with structurally sound components that also provide superior insulation without the environmental damage or danger of fire hazards. A method for forming the thermally efficient construction assemblies is also provided. Although the method is illustrated in a vertical mold, the method may also apply to other casting techniques, including horizontal molds.

Although FIGS. 1-4 are only represented from a left side elevational view, it should be noted that the corresponding right side elevational views are mirror images of the views presented.

Figure 1:
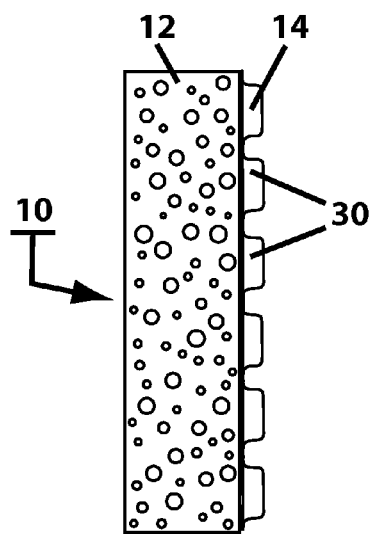
FIG. 1 illustrates a left side elevational view of a construction assembly with a single phase change material layer carried by a single panel of concrete, the right side elevational view being a mirror image thereof.

FIG. 1 illustrates a left side view of construction assembly 10. As seen in FIG. 1, construction assembly 10 includes first concrete panel 12 and phase change material layer which comprises planar base 31 having a series of compartments 30 spaced therealong, also shown in FIG. 10, for containing a phase change material such as a standard phase change gel or phase change aqueous suspension. In alternate embodiments, phase change material layer 14 may be included on one or more sides of concrete panel 12 to increase the thermal efficiency of construction assembly 10. This embodiment may be used in building projects that are seeking thermal efficiency while controlling material cost.

Figure 2:
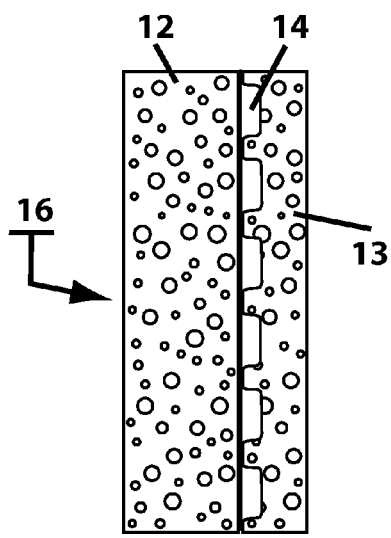
FIG. 2 demonstrates a left side elevational view of a construction assembly with a single phase change material layer disposed between two concrete panels of different widths, the right side elevational view being a mirror image thereof.

FIG. 2 demonstrates a left side view of alternate construction assembly 16 according to an embodiment disclosed herein. Construction assembly 16 includes a thinner second concrete panel 13 affixed to phase change material layer 14 in opposing relation to concrete panel 12. Construction assembly may be used in projects where greater thermal mass and greater structural stability is desired than the stability afforded by construction assembly 10.

Figure 3:
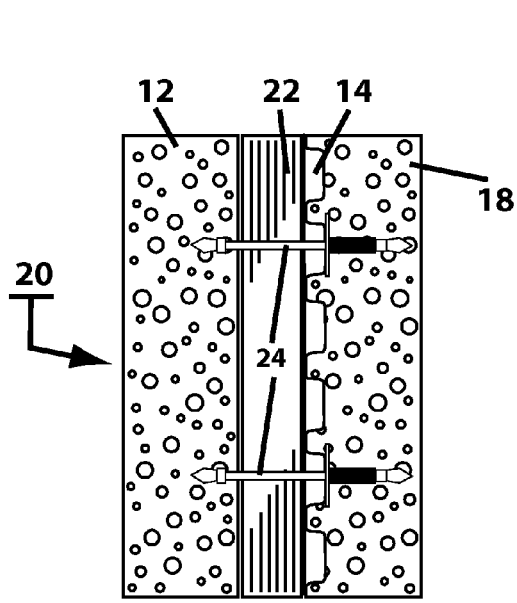
FIG. 3 pictures a left side elevational view of a construction assembly with a support layer carrying the phase change material layer between two panels of concrete with fasteners, the right side elevational view being a mirror image thereof.

FIG. 3 pictures a left side view of alternate construction assembly 20 with phase change material layer 14 attached to support layer 22 with fasteners 24 and positioned between first concrete panel 12 and second concrete panel 18 of equal dimensions. Fasteners 24 pass through planar base 31 and support layer 22 and provide additional structural support in addition to securing phase change material layer 14 to support layer 22. Construction assembly 20 may be used in projects where greater thermal mass and greater structural stability is desired than the mass and stability afforded by either of construction assemblies 10 and 16.

Figure 4:
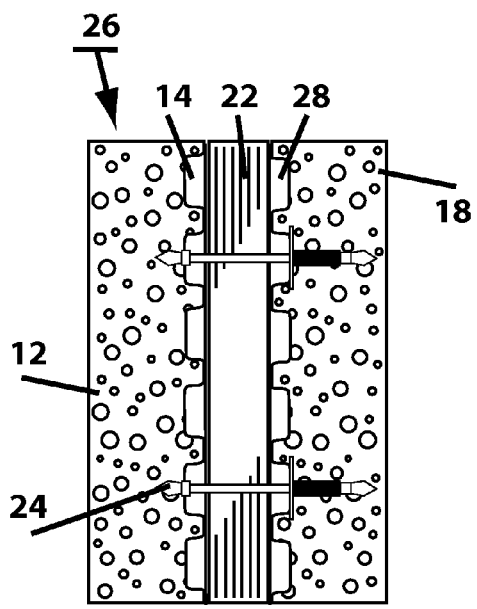
FIG. 4 depicts a left side elevational view of the construction assembly as seen in FIG. 3, with an added phase change material layer mounted to the opposite side of the support layer.
Figure 5:
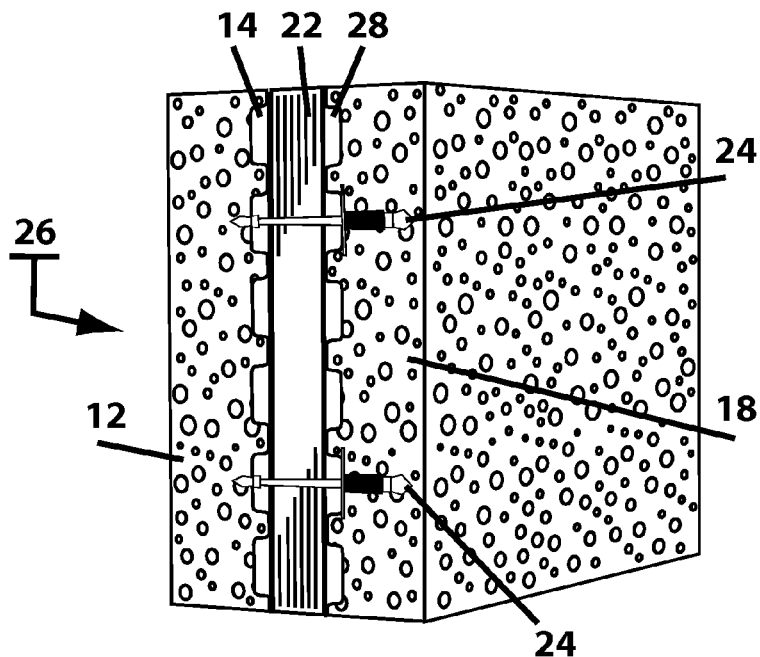
FIG. 5 shows a left perspective view of the construction assembly of FIG. 4.

FIGS. 4-9 show alternate construction assembly 26 in various views having the addition of second phase material layer 28 and second concrete panel 18 which adds structural stability and thermal mass in comparison to construction assemblies 10, 16 and 20 as seen respectively in FIGS. 1, 2 and 3. FIG. 4 depicts a left side view of construction assembly 26 which is similar in all respects to construction assembly 20 but with the addition of phase change material layer 28 attached to the opposite side of support layer 22 utilizing fasteners 24. A left perspective view of construction assembly 26 is shown in FIG. 5. This embodiment has the greatest thermal mass and therefore provides the greatest insulation and structural support for a building project.

Figure 6:
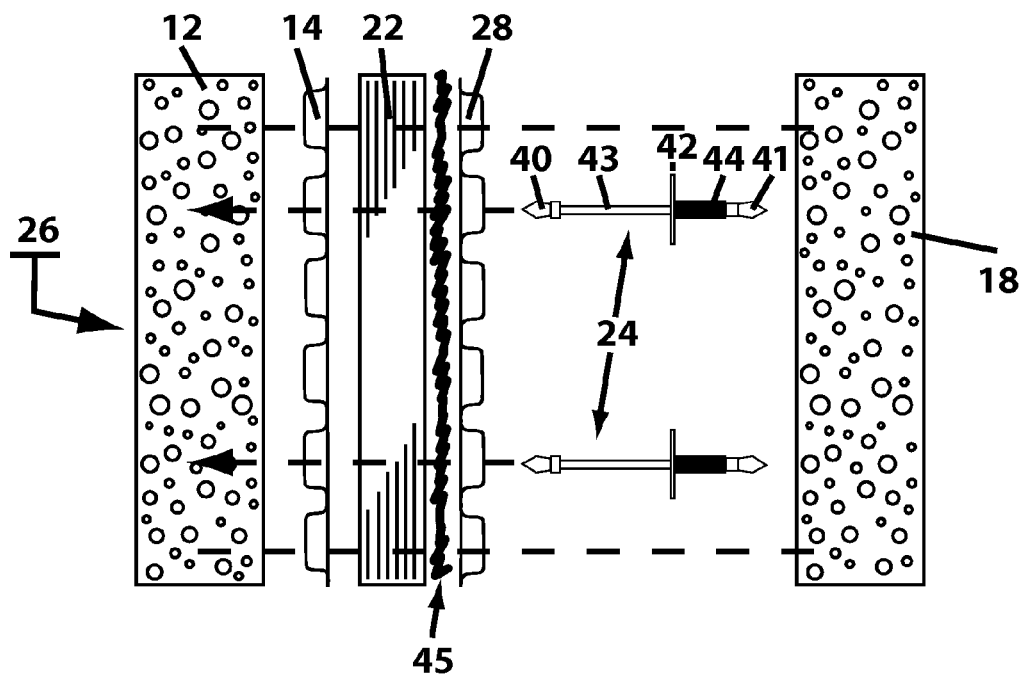
FIG. 6 schematically illustrates an exploded view of the construction assembly as seen in FIG. 4.

FIG. 6 illustrates an exploded view of construction assembly 26 according to one or more embodiments disclosed herein. Phase change material layers 14 and 28 are shown prior to attachment to support layer 22 by fasteners 24 with respectively concrete panels 12 and 18 in opposing fashion on the outside thereof. Although only two (2) fasteners 24 are shown herein more or less could be used depending on the size of the construction assembly required for a particular job. Phase change material layers 14 and 28 although shown herein comprising of a planar base 31 (FIG. 10) and a plurality of compartments 30 may also consist of sheets, sprays, blocks, rolls, powders or contained in solid confinement and can be used in multiple layers.

Fastener 24 may be a conventional mechanical metal rod or other type of fastener, or as an alternative may be an adhesive such as adhesive 45 shown schematically in FIG. 6 between support layer 22 and phase change material layer 28. Although any conventional fastener may be sufficient, the construction assemblies herein exhibit best thermal characteristics with a lightweight fastener that prevents unmitigated heat dissipation. In the preferred embodiment, fastener 24 includes first 40 and second 41 acuminate ends connected by a thin, cylindrical body made of a flexible plastic. Second end 41 also has a threaded outer covering 44 that is continuous with second end 41 and terminates in a substantially rectangular flange 45. In one or more embodiments, first 40 and second 41 ends may be made up of a rigid material such as steel while cylindrical body 43 may be formed from steel, plastic, or a more flexible, synthetic material.

Figure 7:
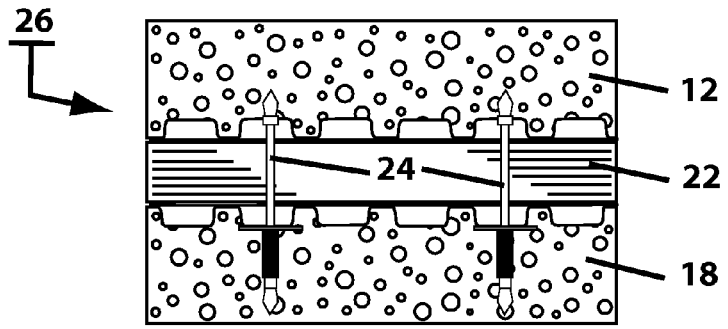
FIG. 7 demonstrates a top plan view of the construction assembly as shown in FIG. 4, the bottom plan view being a mirror image thereof.
Figure 8:
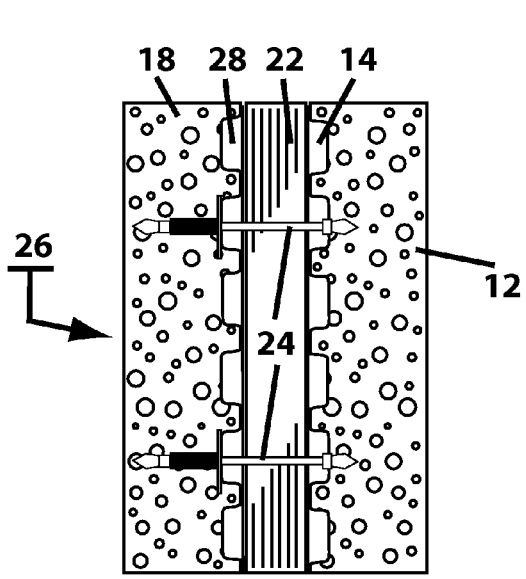
FIG. 8 pictures a right side elevational view of the construction assembly as seen in FIG. 4.
Figure 9:
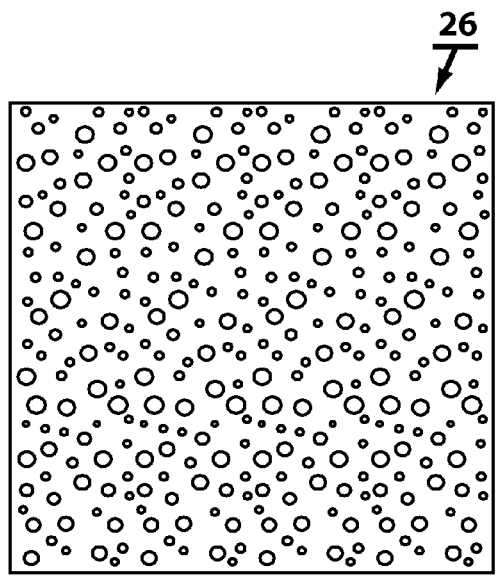
FIG. 9 depicts a front view of the construction assembly of FIG. 4.

FIG. 7 demonstrates a top view of construction assembly 26 disclosed herein. Support layer 22 may be a rigid or semi-rigid insulating material, for example, such as any variety of foam, fiber, natural material or fiberglass or a structural material, for example, such as wood, cardboard, flakeboard, plastic, metal sheet rods, or a grid. A front view of construction assembly 26 is seen in FIG. 9 according to one or more embodiments disclosed herein after being cast in concrete mold 32 (FIG. 10).

The process for casting construction assembly 20 as shown in FIG. 3 is schematically illustrated in FIGS. 10-16. Although not shown, construction assemblies 10, 16, 20 and 26 may also be formed using tilt-up, modular precast, or poured-in-place concrete techniques. With such versatility no preferred dimensions are provided for construction assemblies 10, 16, 20 and 26 as the dimensions would be determined based on the structural use and particular climate zone encountered.

As would be understood concrete panels 12, 13 and 18 are schematically illustrated in rectangular fashion in the drawings and upon forming any of construction assemblies 10, 16, 20 and 26, concrete panels 12, 13 and 18 are in the wet stage and will conform to the shape of phase change material layers 14 and 28 as described in more detail below prior to drying/curing.

Figure 10:
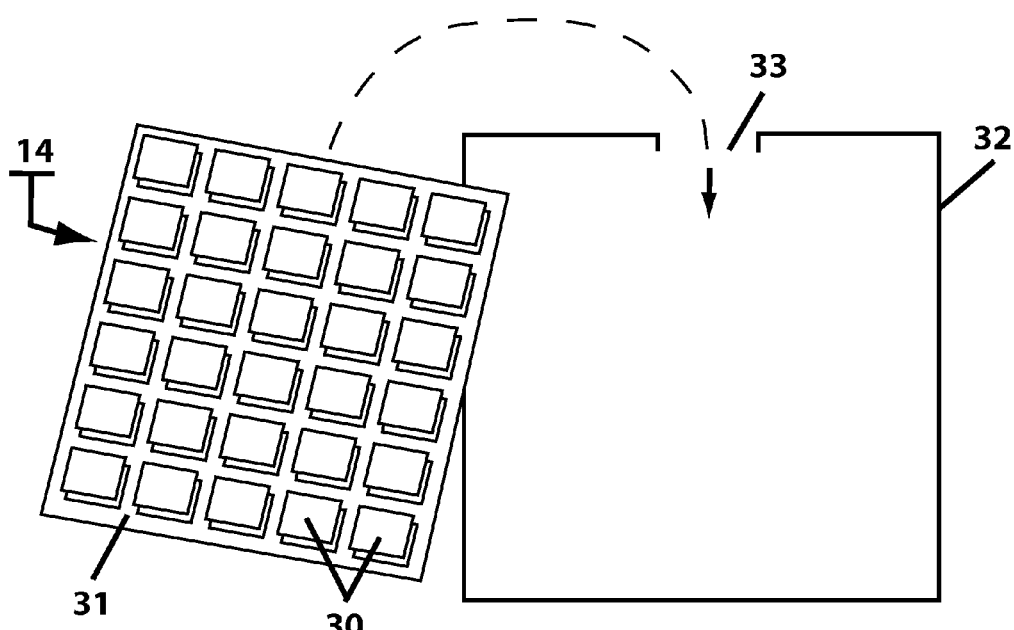
FIG. 10 demonstrates a schematic view of the forming of a construction assembly as seen in FIG. 3 with a concrete mold and commercially available phase change material layer.

FIG. 10 demonstrates a schematic view of the casting of construction assembly 20 (FIG. 3) with concrete mold 32 and phase change material layer 14 having planar base 31 with a plurality of compartments 30 equally spaced therealong. Compartments 30 each contain a phase change material as hereinbefore described. For example, these molds are constructed of materials like wood or fiberglass that may form concrete while providing the necessary flexibility to permit the concrete to harden while remaining in the mold.

Figure 11:
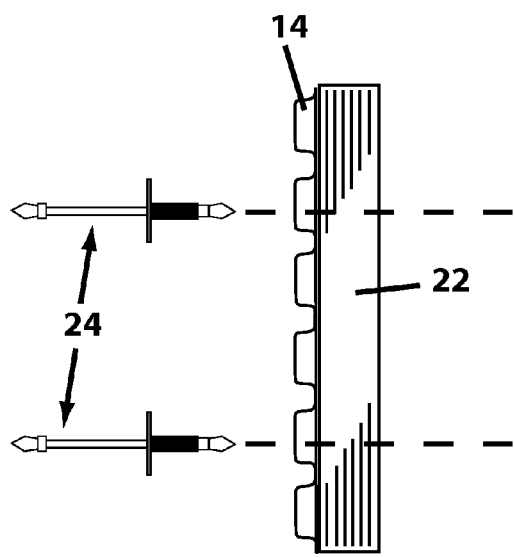
FIG. 11 pictures a schematic view of the casting of a construction assembly as seen in FIG. 3 with the fasteners, the phase change material layer and support layer unattached.
Figure 12:
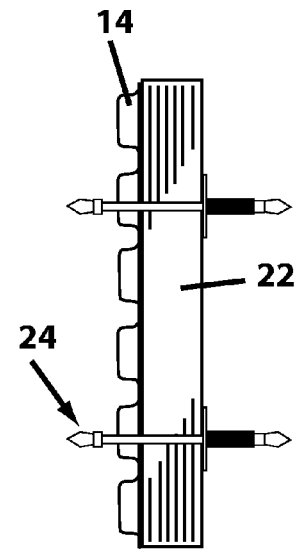
FIG. 12 depicts a schematic view of the forming of a construction assembly as seen in FIG. 3 with the fasteners, the phase change material layer and support layer attached.

FIG. 11 pictures a schematic view of fasteners 24, phase change material layer 14 and support layer 22 separated and prior to casting. FIG. 12 depicts a schematic view of fasteners 24 attaching phase change material layer 14 to support layer 22. Fasteners 24 may be used to center phase change material layer as well as provide structural stability in one or more embodiments of construction assembly 20.

Figure 13:
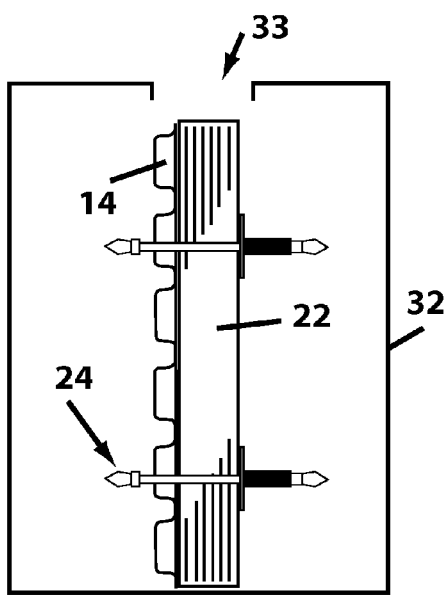
FIG. 13 shows a schematic view of the casting of a construction assembly as seen in FIG. 3 with the attached fasteners, phase change material layer and support layer positioned within the mold.
Figure 14:
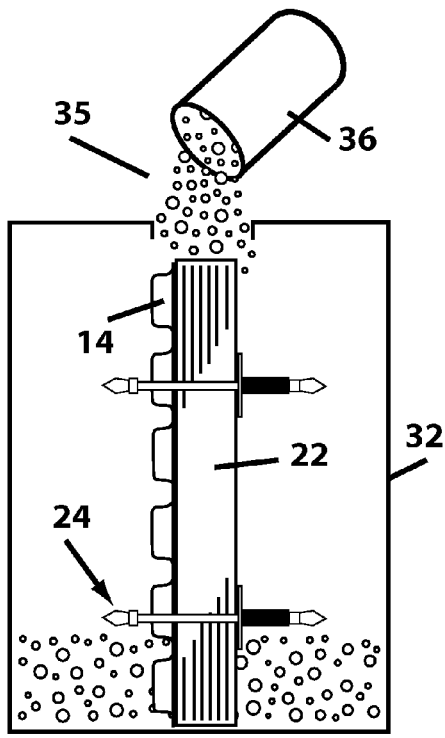
FIG. 14 demonstrates a schematic view of the forming of a construction assembly as seen in FIG. 3 with concrete being added to the mold containing the attached fasteners, phase change material layer and support layer.
Figure 15:
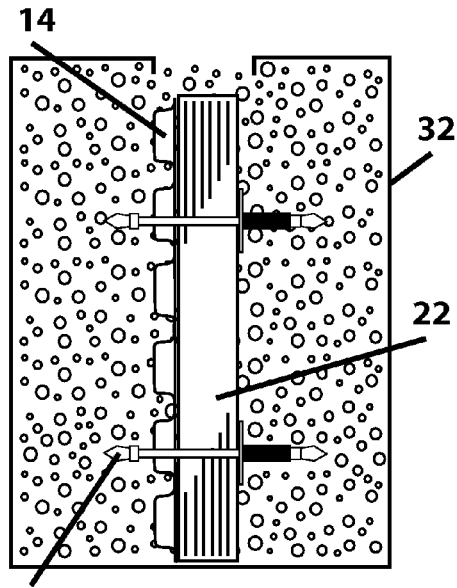
FIG. 15 pictures a schematic view of the casting of a construction assembly as seen in FIG. 3 with a completed insulated panel within the mold.
Figure 16:
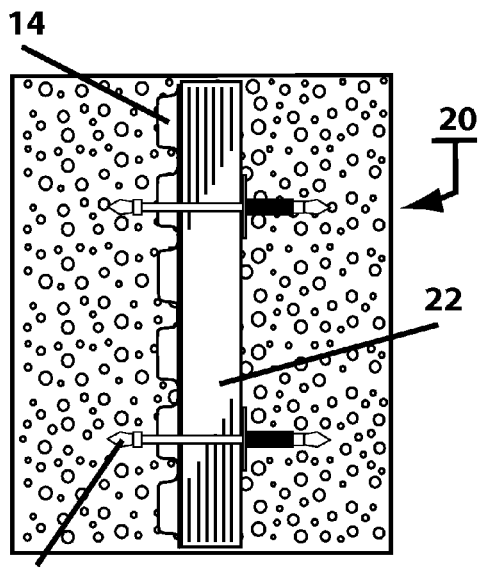
FIG. 16 depicts a schematic view of the forming of a construction assembly as seen in FIG. 3 with a completed insulated panel removed from the mold and ready for use.

FIG. 13 shows a schematic view of phase change material layer 14 affixed to support layer 22 by fasteners 24 and inserted through opening 33 into concrete mold 32 prior to casting. FIG. 14 demonstrates a schematic view of the casting with concrete 35 being poured from container 36 into opening 33 of concrete mold 32. Concrete 35 surrounds one side of support layer 22 and the opposing side of phase change material layer 14 as seen in FIG. 15 and is allowed to cure within concrete mold 32 to provide a completed construction assembly 20. FIG. 16 depicts completed construction assembly 20 as removed from concrete mold 32 and ready for use.

The illustrations and examples provided herein are for explanatory purposes and are not intended to limit the scope of the appended claims.

I claim:

1. A construction assembly comprising:
   a) a first concrete layer;
   b) a second concrete layer defining a width less than said first concrete layer;
   c) a support layer disposed between said first and second concrete layers;
   d) a pair of phase change material layers mounted in opposing relation to opposing sides of said support layer, each of said pair of phase change material layers including a planar base and a plurality of compartments containing a phase change material; and
   e) a mechanical fastener for affixing said pair of phase change material layers to said support layer and preventing unmitigated heat dissipation,
   wherein said construction assembly reduces the changing temperature impact on said second concrete layer.

2. The construction assembly of claim 1 further comprising an adhesive, said adhesive affixing said support layer to said phase change material layers.

3. The construction assembly of claim 1 wherein said support layer is formed from a material selected from the group consisting of foam, fiber, fiberglass, wood, cardboard, flakeboard, plastic, metal sheet rods, and a grid.

4. The construction assembly of claim 1 wherein said mechanical fastener includes first and second opposing acuminate ends.

5. The construction assembly of claim 4 wherein said first and second acuminate ends are connected by a cylindrical body.

6. The construction assembly of claim 5 wherein one of said acuminate ends includes a threaded outer covering continuous therewith.

7. The construction assembly of claim 6 wherein said threaded outer covering terminates in a rectangular flange.

8. The construction assembly of claim 7 wherein said first and second acuminate ends are formed from steel.

9. The construction assembly of claim 7 wherein said cylindrical body is formed from a material from the group consisting of plastic, steel, and a flexible synthetic.

10. A method for forming a construction assembly comprising the steps of:
    a) forming a first concrete layer;
    b) forming a second concrete layer with a width less than the first concrete layer;
    c) disposing a pair of phase change material layers mounted in opposing relation to opposing sides of a support layer between the first and second concrete layers; and
    d) attaching the pair of phase change material layers with a mechanical fastener to prevent unmitigated heat dissipation.

11. The method according to claim 10 wherein attaching the pair of phase change material layers to the support layer comprises the step of fastening the phase change material layers with an adhesive.

* * * * *